United States Patent [19]
Selby et al.

[11] Patent Number: 5,793,728
[45] Date of Patent: Aug. 11, 1998

[54] DISC BLOCKER AND GUIDE FOR CD PLAYER

[75] Inventors: Steven F. Selby, Huntsville, Ala.; Dewayne E. Green, Winchester, Tenn.

[73] Assignee: Chrysler Corporation, Auburn Hills, Mich.

[21] Appl. No.: 93,571

[22] Filed: Jul. 19, 1993

[51] Int. Cl.⁶ ................................................ G11B 33/02
[52] U.S. Cl. ............................... 369/77.1; 369/75.1
[58] Field of Search ........................ 364/75.1, 77.1, 364/77.2, 75.2; 360/93, 96.5

[56] References Cited

U.S. PATENT DOCUMENTS

| 3,940,793 | 2/1976 | Bleimon | 369/77.2 X |
| 4,507,768 | 3/1985 | Ikedo et al. | 369/77.1 |
| 5,084,855 | 1/1992 | Kobayashi et al. | 369/75.2 |

FOREIGN PATENT DOCUMENTS

| 4-245094 | 9/1992 | Japan | 360/75.1 |

OTHER PUBLICATIONS

*Troubleshooting and Repairing Compact Disc Players,* Homer L. Davidson, "The Auto Compact Disc Player" 1989, pp. 244–249, 254.

*Primary Examiner*—Stuart S. Levy
*Assistant Examiner*—William J. Klimowicz
*Attorney, Agent, or Firm*—Lawrence J. Shurupoff

[57] ABSTRACT

A CD disc blocker and guide device is integrated into the escutcheon-lens assembly to prevent insertion of a CD disc between the CD player unit and the top cover to which it is attached. If such insertion is attempted, a guide surface on the device will deflect the disc into an appropriate path for successful CD disc loading. Also, this device prevents the accidental insertion of a CD disc into the player unit when another disc has been loaded therein. This invention accordingly prevents jamming and lodging of the discs in the CD unit or CD-AM/FM radio unit detracting from or preventing unit operation and further eliminates disc damage resulting from improper disc insertion.

3 Claims, 2 Drawing Sheets

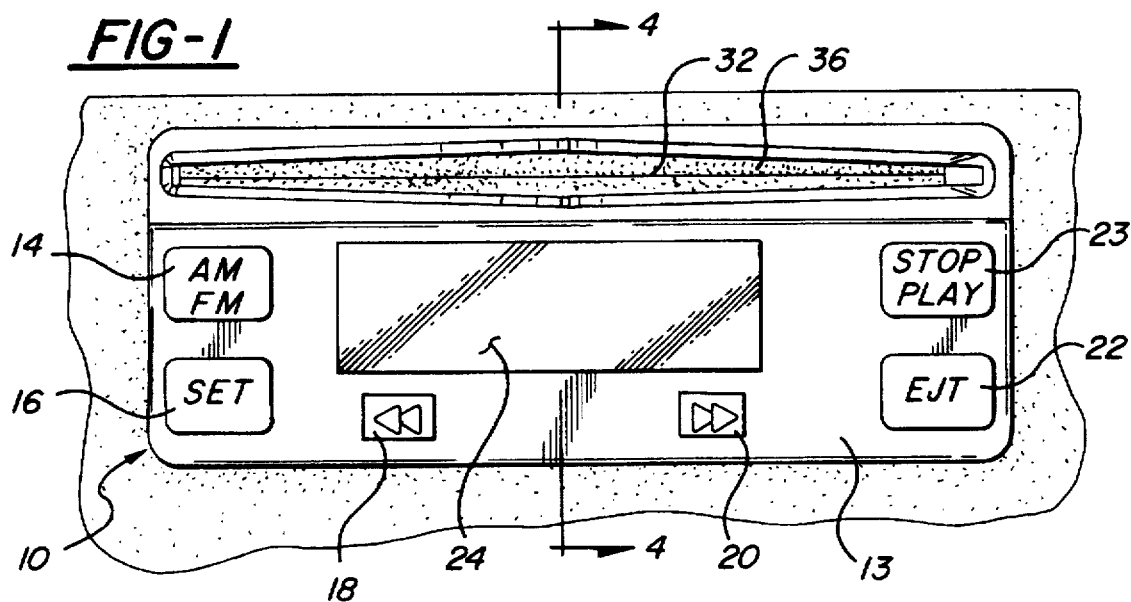
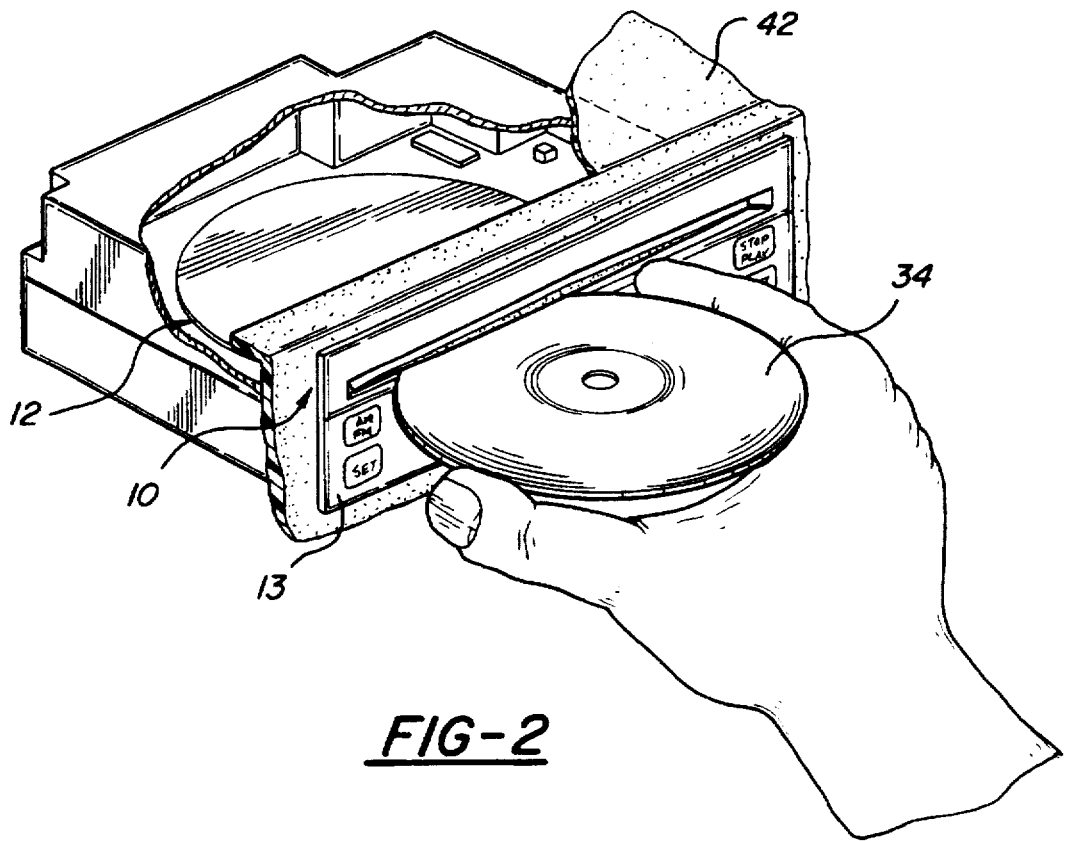

DISC BLOCKER AND GUIDE FOR CD PLAYER

TECHNICAL FIELD

This invention relates to compact disc (CD) players for automotive vehicles, and more particular to a blocker and disc guide construction integrated with the escutcheon-lens assembly for a CD player operatively mounted in a vehicle to guide and prevent the insertion of a CD disc into the player when a CD disc has been previously loaded therein, or the insertion of a CD disc between a support cover and the CD player.

BACKGROUND OF THE INVENTION

Most CD players as used in automobiles are factory installed, front loading units for convenient user access fronting in the instrument panel of the vehicle. Such CD players generally have a finished escutcheon-lens assembly with a longitudinal door therein. This door provides an elongated longitudinal access slot therein which defines a loading and ejection passage for a conventional plastic-coated, metallized CD disc being loaded into or being ejected from the player. With such front loading units, a vehicle operator or passenger can readily insert a disc into the access slot in a limited range of loading paths so that a motor driven loading mechanism will move the CD disc onto a motor driven spindle which rotatably drives the disc for CD disc play. Another motor moves a laser beam unit from the interior to the outside of the CD disc on sliding rods or other carrier construction so that the beam can scan the disc for CD play. CD circuitry in the unit operatively connected to the laser unit output is employed to effect playback.

While such prior CD units have provided improved audio fidelity in many vehicles, users have experienced problems when an attempt is made in loading a second disc when a first disc is already in the player. With such loading, one or both of the discs may be damaged or the discs could become lodged into the unit preventing its operation and resulting in costly repair. This may occur when a disc is inserted for play and CD pause is selected so that a radio mode can be utilized in an integrated CD-AM/FM radio unit. The operator, subsequently, not appreciating that a disc is already in the unit may insert a disc into the CD feed rollers so that disc jamming may result. Such jamming may cause disc damage and possible damage to the CD unit.

Additionally, in an attempt to initially load the CD unit, a CD disc may be angulated into a path that extends through the slot and in between the player and the supporting top cover to which the CD player is secured. The insertion of a CD disc in such path may again cause damage to the disc or the jamming of the disc above or in the CD unit.

While various mechanisms have been designed to prevent accidental disc insertions, they involve (1) costly and complex construction, such as pins which move from a non-blocking position to a blocking position when the disc is inserted or (2) extending window structures which crowds into the space for the compact disc player.

In contrast to the prior constructions, the present invention is drawn to a new and improved disc blocker and guide for a CD player which is small and unobtrusive and readily integrated into the escutcheon-lens assembly and positioned so that a disc is guided into edge contact with a disc already in the unit. Accordingly, a disc cannot be inserted into the player while another disc is within the player.

The disc blocker and guide of this invention further blocks the insertion of a CD disc at predetermined angles with respect to a normal range of loading paths generally aligned with CD slot in the escutcheon-lens assembly and the disc feed opening in the player so that a CD disc cannot be inserted between the CD player and top cover to which the player is attached. The blocker and guide is formed with an angulated guiding surface inboard of the CD loading slot, or passage, which on contact with the leading edge of the disc deflects the disc downwardly into a normal loading path for proper loading into the CD unit.

Accordingly, the present invention is drawn to an anti-insertion device which is integrated into the escutcheon-lens assembly and can be fabricated directly as part of the escutcheon, such as by injection molding, or as a separate device or multiple devices suitably secured in strategic and unobtrusive locations to the escutcheon inboard of and adjacent to the disc insert and eject slot.

These and other features, objects and advantages of this invention will become apparent from the following detailed description and drawing in which:

BRIEF DESCRIPTION OF THE DRAWINGS

FIG. 1 is an elevational view of a portion of a lens-escutcheon assembly of a compact disc player and radio unit as installed in an instrument panel of a vehicle;

FIG. 2 is a pictorial view with parts broken away and parts removed of the lens-escutcheon assembly and CD player and radio unit of FIG. 1 showing a disc being properly loaded therein;

DETAILED DESCRIPTION OF THE DRAWINGS

Figure 3:
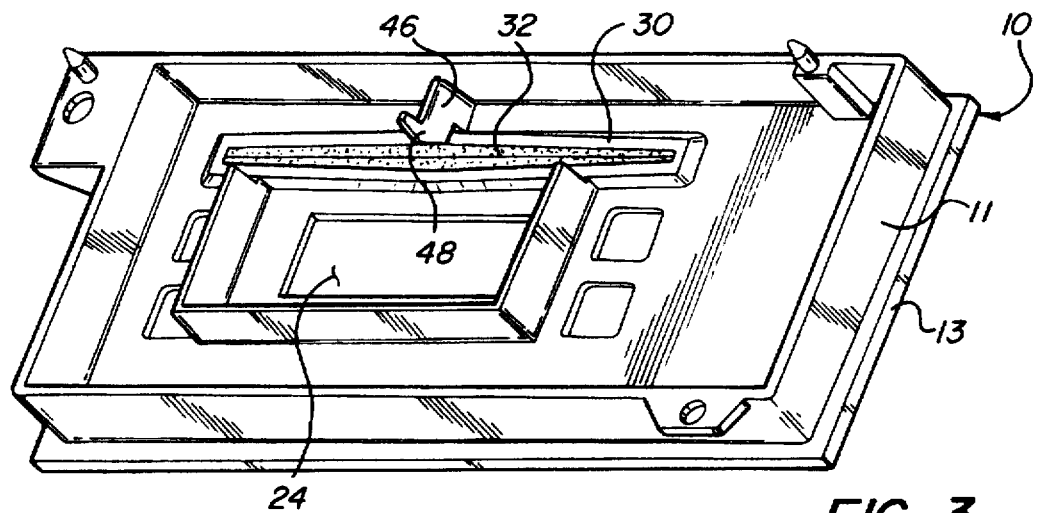
FIG. 3 is a pictorial view of the interior of the lens-escutcheon assembly of FIGS. 1 and 2 with the CD disc blocker of this invention shown therein.

Turning now in greater detail to the drawing, there is illustrated an escutcheon-lens assembly 10 for a compact disc or (CD) player 12 that may be integrated into an AM/FM radio tuner associated with an instrument panel of an automotive vehicle. The escutcheon 11 is preferably a plastics component, injection molded and is secured to transparent or translucent lens 13 having suitable openings therein into which function button 14, 16, 18, 20, 22 and 23 are operatively mounted to selectively control the operation of the CD player and associated radio.

Also the escutcheon-lens assembly 10 has lighted display window 24 which is operational with visual communication, such as track/number and minute/second display, to keep the listener informed about the status of play on the disc and time of play. The display accordingly provides direct user contact regarding the precise operational mode of the CD player. Any light source such as vacuum fluorescent source 25 red light emitting diodes, or silver liquid crystal displays can be employed for the display to advise the user of the status of play.

Additionally, the escutcheon-lens assembly 10 has elongated generally rectilinear opening 28 therein extending between points adjacent to the opposite edges of the escutcheon into which an elongated door frame 30 is fitted. This door frame defines an elongated narrow slot 32 for accommodating a CD disc 34 being manually positioned for subsequent automatic loading into the player or being ejected therefrom. A soft door 36 may be provided by a felt material fastened to the door frame and cut to provide the slot 32 for accommodating the CD disc.

The CD player includes conventional system to move the disc from normal insert position after being moved about one inch past slot 32 (FIG. 2) and into a conventional loading mechanism in the CD player which is activated to automatically move disc 34 onto the spindle of a disc drive system rotatably driven by a motor. A laser pickup system in the CD unit focuses and tracks the laser beam on the digital information coded on the bottom surface of the rotating disc. The data picked up by the pickup system is transmitted into a data decoding system and is transformed by that system into the audio signal which is amplified to excite the speaker system for the users information and enjoyment. After play, the disc can be ejected from the unit by use of the eject function button 22 so that disc translation system can move the disc from the spindle to the unload position allowing the user to manually extract the disc from the unit.

Figure 4:
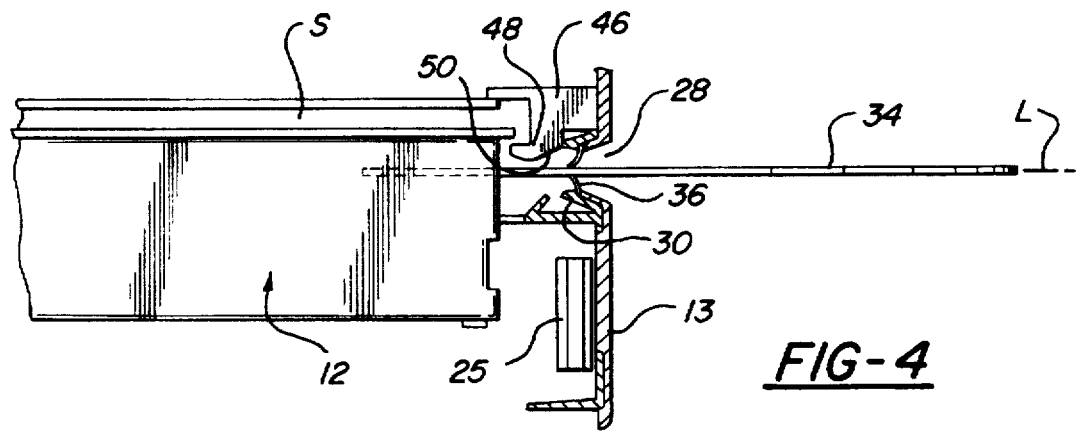
FIG. 4 is a cross-sectional view taken generally along sight lines 4—4 of FIG. 1 showing the disc blocker of this invention in place and the proper insertion of a disc into the player.

Turning now to FIGS. 3 and 4, it will be seen that the door frame 30 is affixed in the slot 32 of the escutcheon-lens assembly and the door frame and the soft door provides the narrow CD disc slot 32 so that the CD disc 34 can be inserted into the position shown in FIGS. 2 and 4. After such insertion, the loading mechanism will move the CD disc to the top of the spindle for rotation about the spindle axis. Assuming that a CD disc has been installed and is playing and the operator subsequently elects a radio function, the CD disc will remain in the player in the normal play position.

Figure 5:
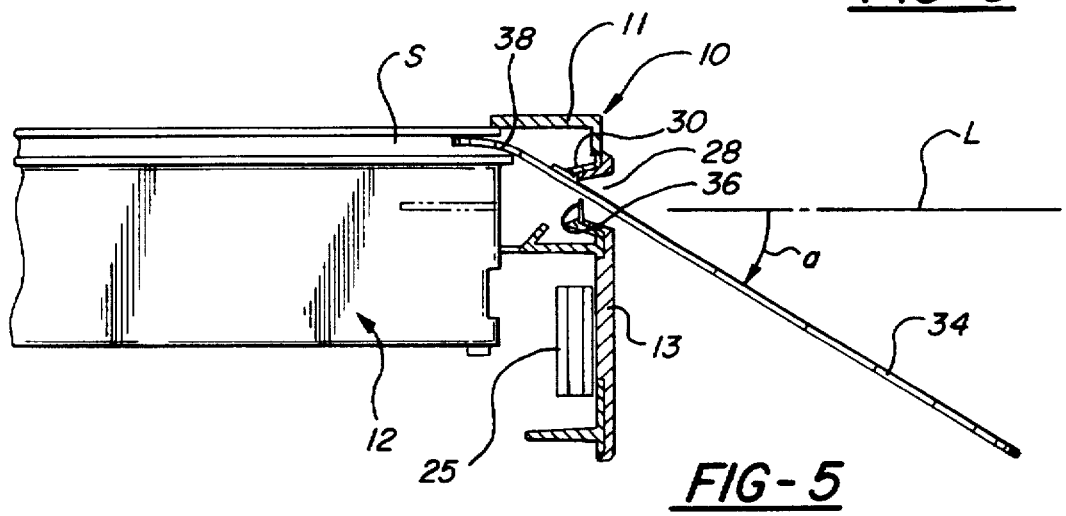
FIG. 5 is a cross-sectional view similar to that of FIG. 1 but with the CD disc blocker removed further showing the improper insertion of a disc in a CD player.

If improperly handled, it is possible to over angulate a disc 34, angle a, relative to the normal loading plane L, and partially, insert a disc in the space S between upper CD player support panel 42 and the top 44 of the CD player as shown in FIG. 5. When this occurs, CD disc 34 may bend at 38 and become lodged in space S and may be damaged.

If a disc 34 is already in the player 12 at the time a second disc is inserted into the player, they may become jammed on one another so that either or both discs are damaged and the CD player may be damaged to such an extent that the player has to be removed for repair.

To eliminate this possibility, the present invention is drawn to disc blocking structure preferably in the form of a blocking shoe 46 shown in FIGS. 3 and 4 which will prevent an improper insertion of a disc in the CD unit. This blocking shoe can be molded as an integral and stationary part of the escutcheon or can be readily glued or otherwise affixed thereto if made separate. As shown, the shoe extends from attachment with the inside surfaces of the upper and front wall of the escutcheon-lens assembly intermediate the width of the door frame and disc slot 32.

The shoe terminates in a disc blocking and deflecting section 48 disposed inboard of the slot 32. Angulated end surface 50 of section 48 facing the slot 32 will deflect and guide disc 34 inwardly into the substantially horizontal plane L. In most instances, the inclined surface 50 will contact the leading edge of the disc 34 and in response to disc insertion force deflect the disc away from area S and into the substantially horizontal loading plane. The disc will then be properly aligned with the CD player feed so that it will be translated onto the drive spindle for play.

In the event that a disc is already in the unit, the disc being loaded will make edge contact with the loaded disc so that two discs are not installed in the CD player and therefor damage to the discs and player is prevented.

Since only one disc can be placed into the CD player, the player is accordingly protected by the anti-insertion and guide device of this invention. A CD disc cannot become damaged because of inadvertent insertions, such as those angulated with respect to the normal loading planes.

One or more of such blockers formed or placed on the back of the escutcheon-lens and strategically located adjacent the access opening as needed.

While a preferred embodiment of the invention has been shown and described, other embodiments will now become apparent to those skilled in the art. Accordingly, this invention is not to be limited to that which is shown and described but by the following claims.

What is claimed is:

1. Escutcheon-lens construction for a compact disc player adapted to be operatively mounted in a vehicle, said escutcheon-lens construction comprising a door frame, a door fastened along the perimeter thereof to said door frame, said door having a slit that is normally closed and is openable by a compact disc so as to define an elongated disc opening therein for the passage of a compact disc between a loading position external of the compact disc player and a play position within the player, singular opening restrictor and disc guide means located at and affixed behind said door to said escutcheon-lens construction at a point intermediate the width and on only one side of the disc opening and extending internally thereof to permit the successful insertion of the disc through said door and into the player in a predetermined loading and unloading first path substantially aligned with said opening while blocking the insertion of a disc past said door in predetermined second paths inclined with respect to the loading and unloading path.

2. The escutcheon-lens construction of claim 1, wherein said opening restrictor and disc guide means is a blocking shoe member affixed to the interior of said escutcheon-lens construction, said shoe member being formed with an angulated guide surface immediately behind said door for contacting and deflecting a disc being inserted toward the player in said second paths into said first paths.

3. The escutcheon-lens construction of claim 2, wherein said shoe member prevents the insertion of a disc through said opening past said door so that said disc cannot become lodged in a space above said compact disc player.

* * * * *